US012624978B2

(12) United States Patent
Thiel

(10) Patent No.: US 12,624,978 B2
(45) Date of Patent: May 12, 2026

(54) METHOD FOR DETERMINING A MASS FLOW AND CONVEYING AND MEASURING DEVICE

(71) Applicant: CiTEX Holding GmbH, Melle (DE)

(72) Inventor: Marius Thiel, Osnabrück (DE)

(73) Assignee: CiTEX Holding GmbH, Melle (DE)

( * ) Notice: Subject to any disclaimer, the term of this patent is extended or adjusted under 35 U.S.C. 154(b) by 368 days.

(21) Appl. No.: 18/316,441

(22) Filed: May 12, 2023

(65) Prior Publication Data

US 2023/0366713 A1     Nov. 16, 2023

(30) Foreign Application Priority Data

May 13, 2022     (DE) ..................... 10 2022 112 046.5

(51) Int. Cl.
*G01F 1/76* (2006.01)
*G01G 11/08* (2006.01)
(52) U.S. Cl.
CPC .............. *G01F 1/76* (2013.01); *G01G 11/08* (2013.01)
(58) Field of Classification Search
CPC .. G01F 1/76; G01F 1/30; G01F 1/712; G01G 11/08; G01G 11/083; G01G 11/12
See application file for complete search history.

(56) References Cited

U.S. PATENT DOCUMENTS

| 2011/0198197 A1 * | 8/2011 | Blickley | ................... B29B 7/60 |
| | | | 73/861.351 |
| 2021/0364340 A1 * | 11/2021 | Helfenstein | ............ G01G 13/06 |

FOREIGN PATENT DOCUMENTS

| CN | 101285697 A | 10/2008 | |
| DE | 229908 A1 | 11/1985 | |
| DE | 3540165 A1 | 5/1987 | |
| DE | 4414715 A1 | 11/1995 | |
| DE | 69226204 T2 | 10/1998 | |
| DE | 20101509 U1 | 5/2001 | |
| DE | 10103854 A1 | 8/2002 | |
| DE | 102005053352 A1 | 5/2007 | |
| EP | 0533968 A1 | 3/1993 | |
| EP | 0706642 B1 * | 10/1999 | ............ G01G 11/12 |

* cited by examiner

*Primary Examiner* — Timothy P Graves
(74) *Attorney, Agent, or Firm* — Barnes & Thornburg LLP

(57) ABSTRACT

A method for determining a mass flow of bulk material in a conveyor line includes providing a conveyor line, continuously receiving bulk material, transporting the bulk material on the conveyor line, and discharging the bulk material at an end point of the conveyor line. The conveyor line includes an array of weighing cells having a plurality of weighing cells successive in a direction of transport.

22 Claims, 4 Drawing Sheets

Figure 1:
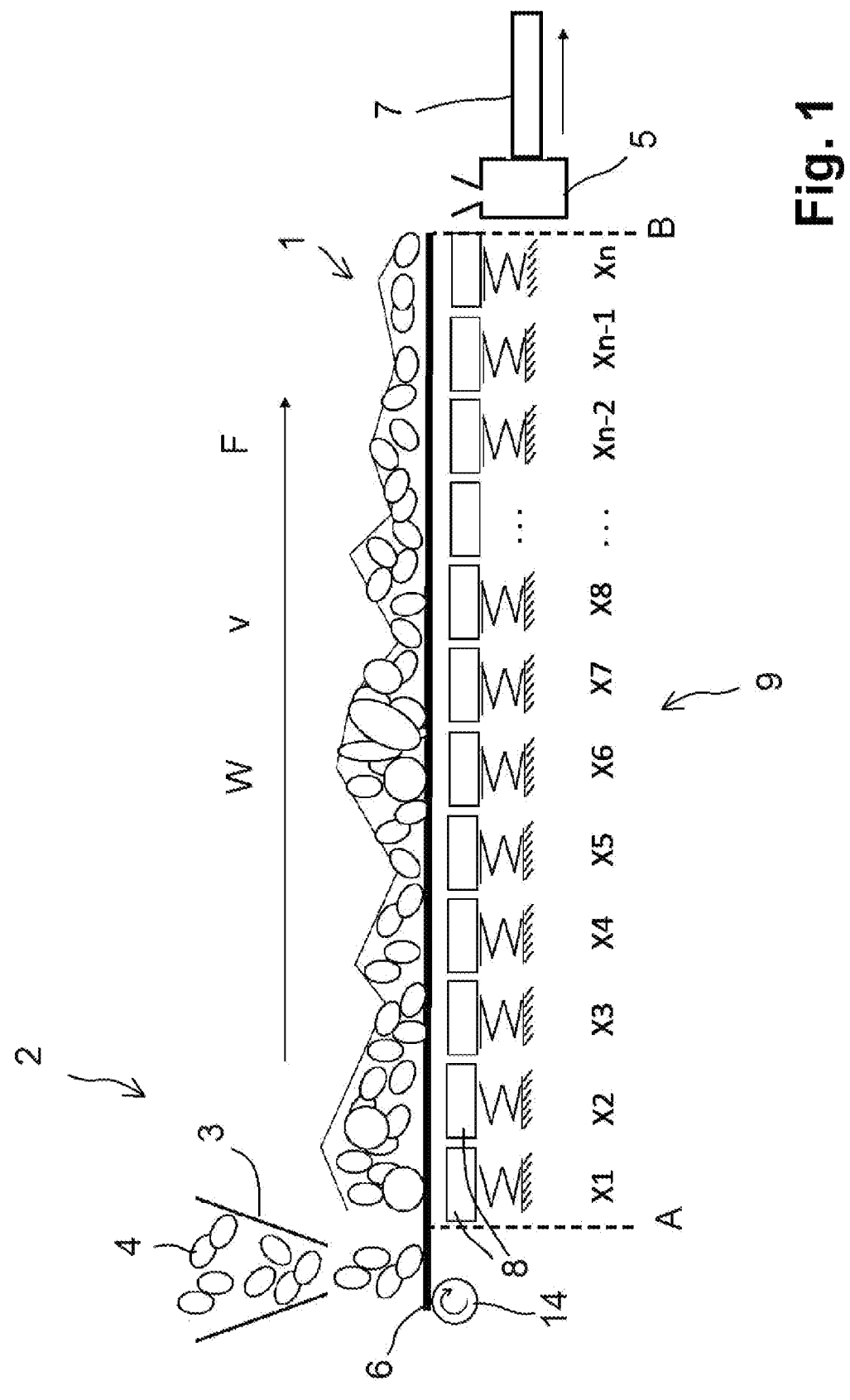

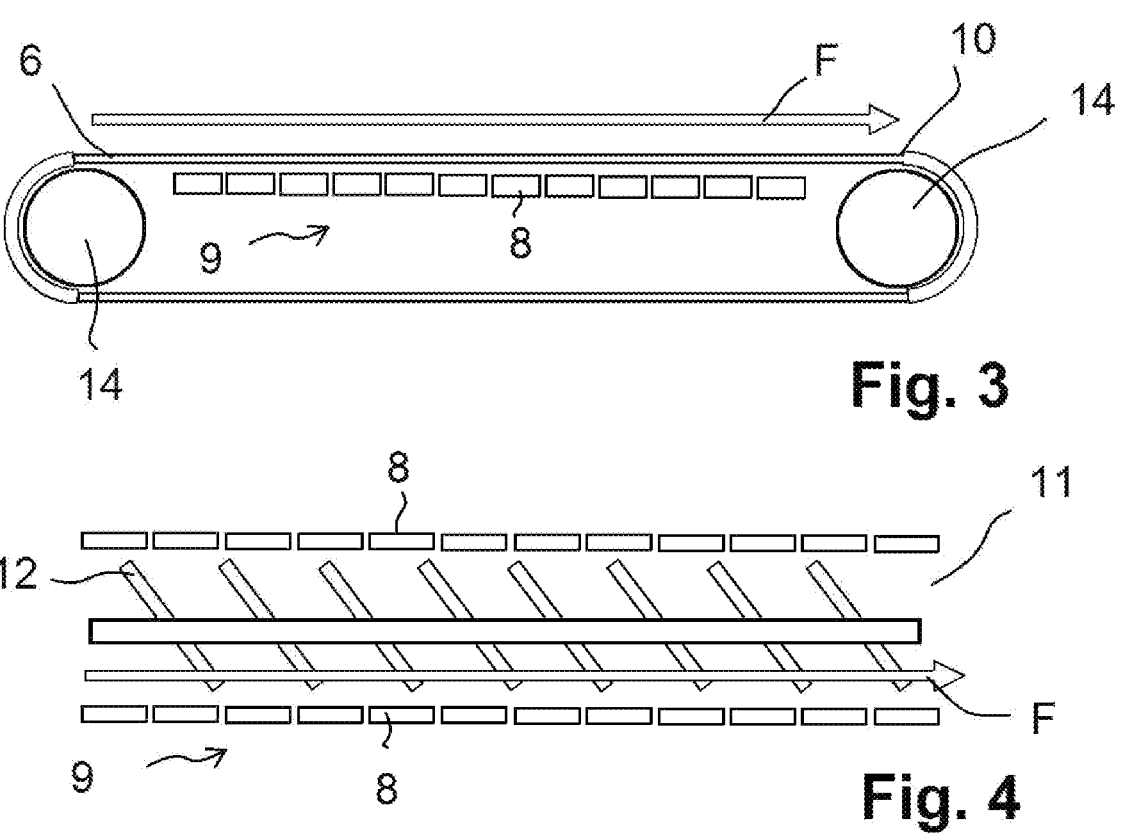
Fig. 3
Fig. 4
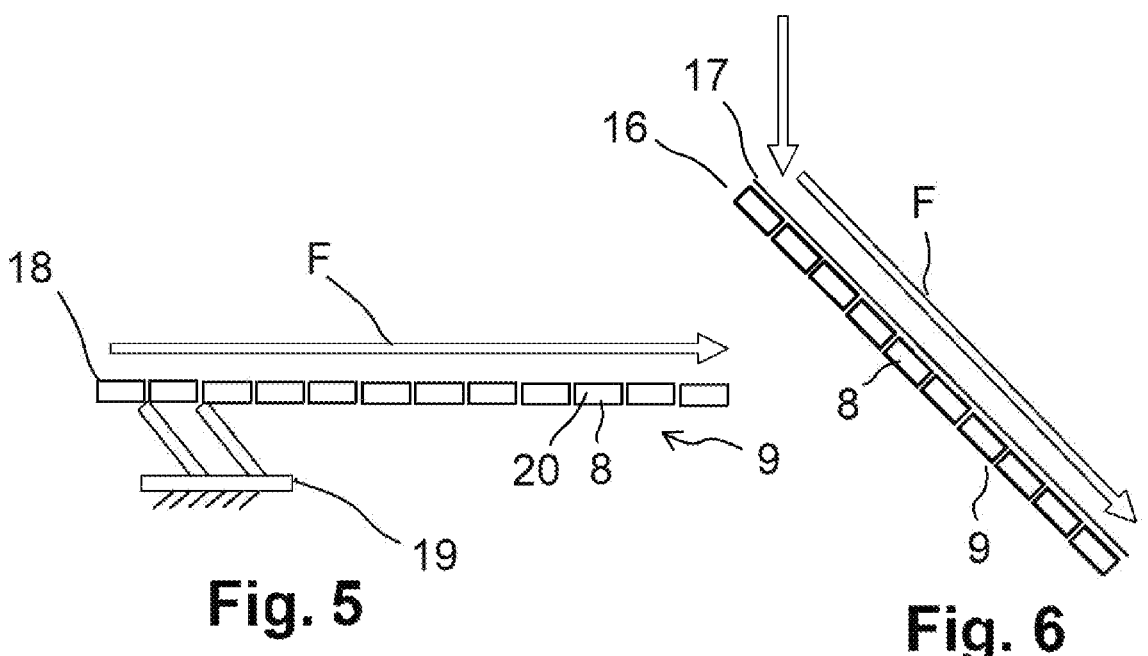
Fig. 5
Fig. 6

METHOD FOR DETERMINING A MASS FLOW AND CONVEYING AND MEASURING DEVICE

This application claims priority under 35 U.S.C. § 119 to German Application No. 10 2022 112 046.5, filed May 13, 2022, which is expressly incorporated by reference herein.

The invention relates to a method of determining a mass flow as well as a transporting and measuring device. Further, a control method is created.

Conveyor lines serve generally for transporting granulated bulk material, for example, pellets, granulate, flakes or grains and are utilized, for example, in a production plant, for example, an extruder, to transport the bulk material continuously from a bulk material feeder towards the processing unit.

The granulated bulk material will generally be distributed unevenly across the conveyor line. In part, it will already be received by the bulk material feeder in a discontinuous intermittent manner and forms uneven accumulations of material on the conveyor line. Hereby, the bulk material will tend to agglutinate, also depending on its material characteristics and, for example, on temperature and humidity. However, many applications require exact information on the mass flow, in particular, in a bulk material feed towards a processing unit.

Moreover, in some conveyor lines the transport velocity of the material is not known precisely, for example, in the case of vibration feeders, deflector plates, and screw conveyors. In the case of belt conveyors, the actual belt velocity will depend on slippage on the deflection rollers which, in turn, will depend on, e.g., on the tension of the elastic conveyor belt and the load inflicted by the mass.

For measuring a fed-in mass flux, gravimetric weighing devices are known, wherein a transporting device is weighed together with the material contained therein so that a measured value is received continuously as a function of time and the mass flux can be determined. The precision of such systems is limited, however.

Further, it is known to measure the mass flux in an air flow allowing, in particular, for the detection of the flow velocity, however, without precisely detecting the mass flux conveyed hereby.

Conveyor belt weighing devices allow dynamic measuring of a feed rated on a conveyor belt, wherein the weight on the belt can be determined by a weighing cell as a function of time so that a mass flux can be determined.

The document DE3540165A1 describes a method and a device for fine metering of bulk materials, wherein a flow of granulated material is detected via weighing cells. The citations EP0533968A1 and DE102005053352A1, too, describe measuring systems, wherein the weight of transported masses is detected via weighing cells.

The document DE4414715A1 shows a method for determining the feed rate of a belt scales and a device for executing the method. Hereby, at least two weighing cells are provided at a pre-determined distance, whose weighing signal trajectories are evaluated, where the belt velocity and the distance of the weighing cells are taking into consideration, to put out an error signal.

The citation DD229908A1 shows a device for determining a mass flux, where, for one thing, a conveyor belt velocity is determined from signals of mass sensitive sensors by means of a correlation algorithm and, for another, the value of the mass density on the conveyor belt is determined by averaging. The mass throughput is determined by multiplicative linking of conveyor belt velocity and mass density. Furthermore, the sensor monitor each other so as to indicate any failure.

In the document DE10103854A1 a measuring device for determining a continuous mass flux of granulated materials is described, consisting of two modular spiral chute parts each resting on three weighing cells. Each spiral chute part consists of a downwards angled spiral onto which a continuous mass flux is supplied. Upon passing of a flux of granulated materials, both the spiral load as well as the flow velocity are determined using the weighing cell signals, and the transport rate and/or the feed rate is calculated from this.

The citation DE69226204T2 shows a device for weighing continuous flowing, grainy or pulverized material, wherein the mass flux of the material is determined as a function of measurements of forces exerted on an inclined first plate which lies essentially straight in the direction of flow and onto which the flowing material flows slidingly, where force measuring means support and measure the plate.

Thus, the invention is based on the object of creating a method and a transporting and measuring device allowing for a precise determination of a mass flow.

This task is solved by a method and a transporting and measuring device according to the independent claims. The sub-claims specify preferred further developments. Moreover, a control method is created utilizing the method. The method for determining a mass flow according to the invention may be carried out, in particular, in the transporting and measuring device according to the invention.

Thus, the mass flow on the conveyor line is chronologically detected by an array of weighing cells consisting of a plurality of weighing cells that are successive in the direction of transport. The weighing cells generate spatially and temporally resolved measuring values measuring values, i.e., in particular, discrete measuring values corresponding to the arrangement of the individual weighing cells. Thus, it is possible to compare or correlate measuring values of the successive weighing cells with one another. In particular, the measuring values of the weighing cells consecutive in the direction of transport can be compared to one another under consideration of a temporal offset or a time difference respectively. From this comparison it is possible to deduce, directly or indirectly, the mass flow.

Thus, other than in, e.g., conveyor belt scales, a comparison is carried out between several measuring values depending on a position and time, i.e., in particular, even from various positions, to determine a mass flow from this.

This is based on the finding that upon transporting the bulk material structures are formed as different mass values of the individual weighing cells which, in particular, are created by accumulation and uneven distribution, where such structures essentially remain during transport in the direction of transport or possibly change to a recognizable extent. Thus, a spatial-temporal comparison can be carried out, wherein spatial measuring value sequences or patterns respectively are compared to spatially and temporally successive measuring value sequences or patterns respectively. This can be made, in particular, using a type of auto-correlation or autocorrelation respectively. This comparison can be used to detect that the mass accumulation was transported in the time difference across the corresponding distance resulting from the geometric distance of the weighing cells. Thus, the array of weighing cells preferably determines both the mass in the individual weighing cells and the transport velocity. Thus, the mass flow can be determined from these two values.

This already creates a few advantages. The plurality of weighing cells form a relatively simple, cost-effective, precise and robust sensor system which does not affect the mass flow and the conveyor line, in contrast to, e.g., gravimetric or volumetric dosages. The measured values can be used directly to deduce the mass contained in the weighing cell, without having to resort to, for example, conversions from a volume to a mass, as sometimes required in volumetric measurements.

The method can be carried out continuously during transport and production. In principle, no initial calibration is required, because the continuously detected measuring signals and measuring values can be compared to one another. Hereby, both the transport velocity and the mass of bulk material conveyed at this transport velocity can be determined so that it is possible to determine the mass flow with precision.

Compared to gravimetric dosages, there is no weighing of the entire dosing device or a storage or scales container respectively. In contrast to material flow measurements in an airstream, it is not only possible to determine a velocity but also the mass flow conveyed at the velocity with a high degree of precision.

"Comparison" does not necessarily mean that spatially displaced structures or patterns are checked for their identity, since it is possible that material dislocations can change somewhat. Rather "comparison" is to be understood as the determination of equal or similar structures. For the purpose of evaluation, it is possible to carry out, in particular, a correlation, i.e., in particular, an autocorrelation of the measuring signal, wherein the measuring signal is correlated with itself, e.g., at various points in time, in particular, at various points in time and with various distance displacements. Such a comparison can be carried out automatically in a program or, respectively, evaluation procedure, until a high significance or, respectively, high autocorrelation is determined. In particular, an autocorrelation allows for a comparison of similar, not precisely identical structures It is a further advantage of the invention that the material tracking enables determination of and compensation for loading disorders such as, e.g., strong material deposits on scales elements and temporally sluggish sensor drifts, e.g., tare shifts etc.

The array of weighing cells may be formed as a one-dimensional line array or as multi-dimensional weighing cell matrix, wherein, additionally, one or more further weighing cells are provided in a lateral direction or, respectively a direction offset in relation to the direction of transport.

Thus, preferably, a discretization of the mass flow into the individual measuring values is carried out. This discretization may be carried out mechanically, i.e., e.g., by subdividing into mass packets using the respective conveying organ, and/or sensorially, i.e., by partially measuring a part of the mass flow across the individual weighing cells.

According to one embodiment, the array of weighing cells is formed as a coating or part of a coating, consequently attached to the conveyor means in suitable places, in particular, on the static housing and/or on moving parts. Such a coating, e.g., in the form or a sensor sheet with individual weighing cells, is affordable and can be manufactured in a standardized manner, e.g., including strain gauges or piezo-foils, and can be flexibly attached.

The transmission of the measuring values and the energy from and to the weighing cells may be carried out over wire or wireless, e.g., by way of NFC (Near Field Communication) and/or using passive transponders, so that, in particular, a utilization is also possible on moving parts.

In addition hereto or in the alternative, the transport velocity may also be determined using further data, e.g., a known or corrected belt velocity.

Thus, a method is created allowing for a secure, flexible, quick and precise determination with little expenditure, in particular, a cost-effective and secure weighing cells device.

The method according to the invention can be utilized, in particular, in a control system or a control method respectively such that a material feed and/or a downstream production plant or processing facility respectively is controlled depending on the mass flow determined. Thus, it is possible to regulate the mass flow, in particular, to maintain a constant value, for example, by controlling the material feed. Further, it is also possible to control a downstream processing facility, for example, an extruder, so that it receives the determined mass flow in a suitable manner, for example, by controlling the barrel extruder or an extractor of the extruder plant.

Thus, it is possible to control the mass flow without necessarily having to resort to a "loss in weight" method with discrete and known initial masses. Preferably, the regulation can be optimized because the different "loading conditions" are known from the forward feed upon conveying even prior to the material being discharged. Thus, it is not required to first measure the material discharge and possible the generated product; rather, the mass flow is determined already upon so that a forward-looking regulation is possible.

Accordingly, a transport and measuring device is formed which can be operated using the method according to the invention. Hereby, various applications are possible. In a belt conveyor the weighing cells may be arranged directly beneath the conveyor belt or integrated therein so that precise measurements are possible owing to the flexible conveyor belt. In a screw feeder the weighing cells may be arranged, for one thing, in the floor area, and, for another, also in lateral areas or, respectively, beside the further weighing cells as seen in the circumferential direction or screw direction, since the screw feeder presses the material also laterally outwards and upwards. Thus, the weighing cells are sequential, e.g., in the screw direction.

When utilized in a deflector plate conveyor, for one thing, the impulses of the material particles from the height on the front area of the deflector plate can be measured and converted into a in particle mass. Also, the slippage characteristics can be determined in the further course of the deflector plate by a plurality of weighing cells successive in the direction of transport or direction of slippage respectively so that the direct material feed and the mass flow in the slippage direction can be detected and evaluated.

In a vibration feeder the weighing cells may be arranged directly in the vibration plates thereby detecting the material value of the granulated material as well as the accelerations caused by the excitation or vibration respectively. Hereby, the forces created by the vibration excitation can be deducted as known or, respectively, with a known temporal signal so as to allow precise measurements.

In principle, the method according to the invention and the device according to the invention can be formed in all conveyor systems in that the weighing cells or, respectively, a measuring matrix consisting of the weighing cells is utilized as an additional unit, e.g., as a coating, to allow measuring and evaluating the material flow over location and over time.

Advantageously, the individual weighing cells yield only to a small extent under the material load so that the have no or merely negligible impact of the mass flow; this may happen, e.g., by using piezo force sensors or wire strain gauges, which can be made in a cost-efficient manner and yield only to a small extent in the direction of the load.

As bulk material, for one thing, a plastics material, e.g., polyethylene, polypropylene or PVC, or rubber material may be fed in, where it is fed in, e.g., in the form of pellets, granulate, powder or flakes. Further, additionally, an additive may be fed as granulated material, e.g., soot, barium sulfate, or calcium carbonate, in particular, as granulate, powder or pellets. Hereby, the mass flow of the plastics material and/or rubber material and/or the mass flow of the additive may be measured and regulated. It has become apparent that the method according to the invention is of advantage, in particular, for metering such materials, in particular, in feeding an extrusion plant, because the transported mass flows, in view of their characteristics such as, e.g., their density and texture, can be well measured in the conveyor line using the plurality of weighing cells.

Thus, it is also possible, in particular, to precisely and, in particular, quickly measure and regulate, via suitable conveyor lines, the mass flow of the various components, i.e., e.g., plastics material and additives, in terms of dynamic changes, so as to avoid extrusion of faulty products which would otherwise often have to be measured afterwards using, e.g., an ash test.

According to one embodiment, the weighing cells may be designed as piezo sensors and/or wire strain gauges.

In the method, according to one embodiment, the weighing cells may detect their respective mass load in a piezoelectric manner and/or by means of wire strain gauges.

At least one of the measuring cells of the array of weighing cells may be designed as a coating or part of a coating, e.g., as a sensor foil with individual measuring cells.

A transmission of the measuring values and/or energy to and from the measuring cells may be provided wireless, e.g., as an NFC (Near Field Communication) and/or using passive transponders.

The plurality of weighing cells may be arranged as a one-dimensional line array or multi-dimensional matrix with weighing cells successive in the direction of transport.

According to one embodiment, a one-dimensional or multi-dimensional matrix each is created from measuring values at at least two points in time, and a pattern recognition and/or a correlation which may be, in particular, an autocorrelation, is carried out from these at least two matrixes, so as to determine a match in the structures or measuring value sequences.

According to one embodiment, the transporting and measuring device can be designed as a screw feeder including a screw conveyor, where the weighing cells are provided in a lower floor area and preferably in areas adjacent in the circumferential direction, in particular, distributed across the circumference of the screw feeder.

Figure 2:
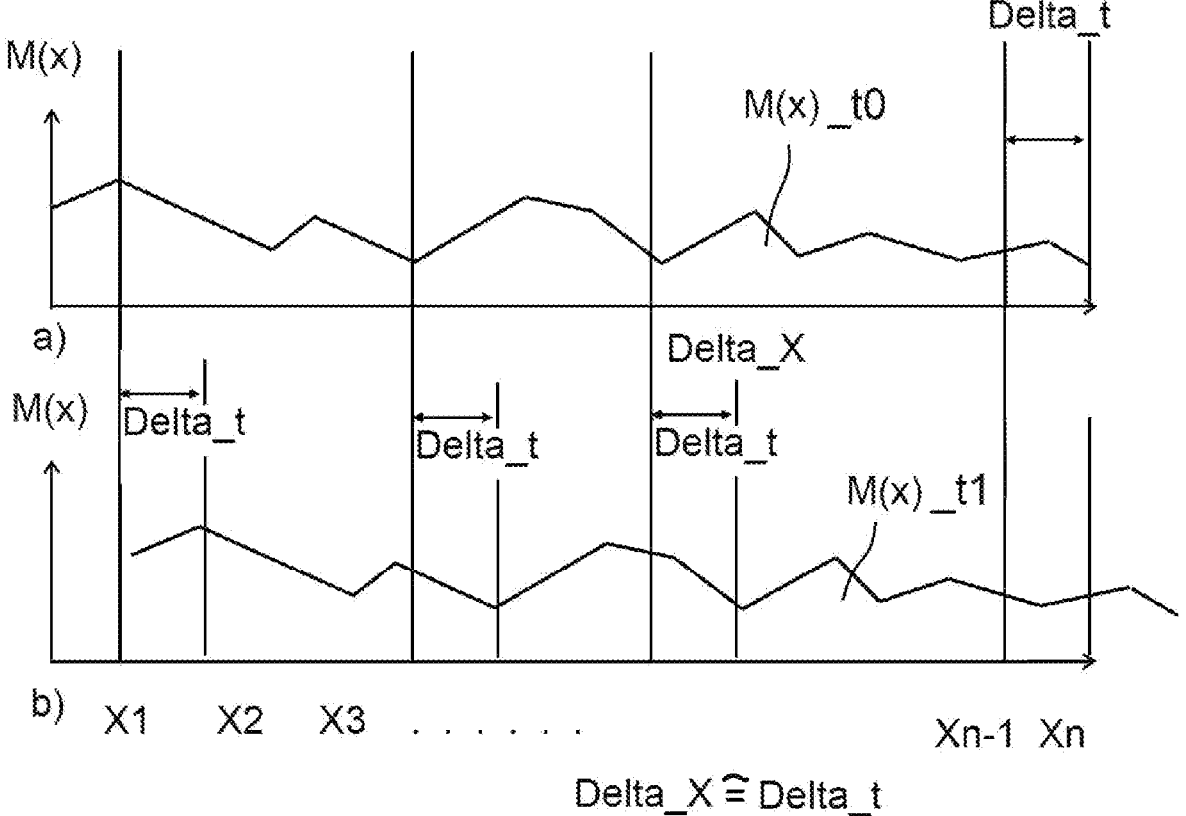

The invention is illustrated below by means of the attached drawings by means of a few embodiments. It is shown in:

FIG. 1 a transporting and measuring device according to one embodiment;

FIG. 2 measuring signals of the sensor channels at successive measuring times;

FIG. 3 an embodiment with a belt conveyor.

FIG. 4 an embodiment with a screw feeder;

FIG. 5 an embodiment with a vibration conveyor;

FIG. 6 an embodiment with a deflector plate; and

Figure 7:
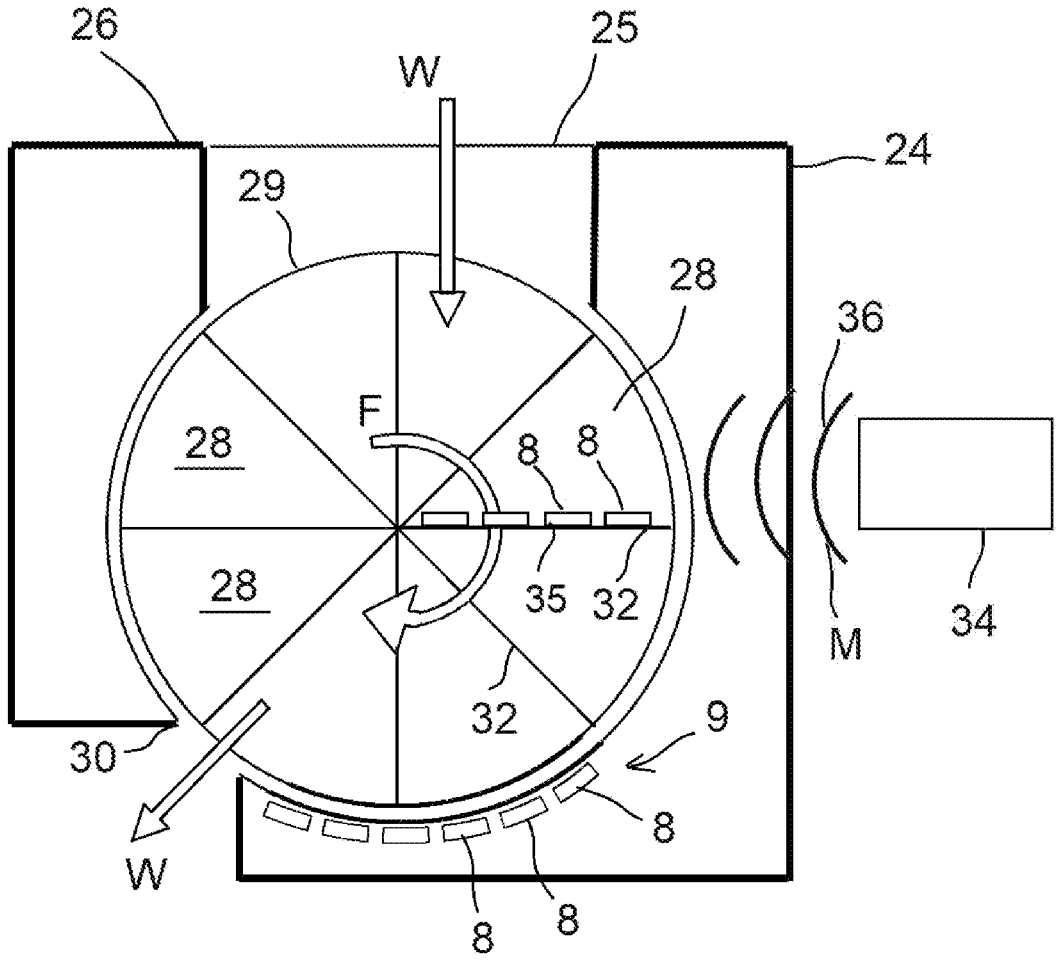

FIG. 7 an embodiment with a cellular wheel conveyor.

According to FIG. 1 a conveyor line 1 in a production plant 2 is provided. Die production plant 2 comprises, for example, a bulk material feeder 3 with a collecting funnel for feeding granulated bulk material 4. As bulk material 4, for example, pellets, granulate, powder or flakes may be fed-in. Thus, the bulk material 4 reaches the conveyor line 1 and is transported on the conveyor line 1 from one or more starting points A in the direction of transport F to an end point B, for example, to a processing unit 5, e.g., an extruder putting out a processed product 7. Hereby, the bulk material feeder 3 and processing unit 5 are named by way of example only because, in principle, the transport of bulk material 4 may be provided for other purposes also.

On the conveyor line a weighing cells matrix 9 consisting of weighing cells 8 is provided, which is designated in FIG. 1 along the direction of transport F as X1 through Xn. In this embodiment, the weighing cells matrix 9 is designed as a line array, i.e., as a one-dimensional arrangement of the weighing cells X1 through Xn which are directly successively in the direction of transport F. In other embodiment, two- or multi-dimensional arrays may be provided, i.e., including two or more weighing cells in the depth direction perpendicular to the drawing plane.

Each weighing cell Xi, i=1n measures the weight acting on the conveyor belt 6 as a measuring value Mi, i=1 through n. Advantageously, the weighing cells X1 through Xn are provided directly beneath the conveyor belt 6, without any further static downwards support of the conveyor belt 6, so as to provide a measuring value Mi of utmost precision. However, the weighing cells X1 through Xn may also be, e.g., integrated into the material of the conveyor belt 6.

FIG. 2 shows in two diagrams a) and b) each the measuring value M as a function of the spatial coordinate X along the direction of transport F, i.e., as M(x). Hereby, the measuring values M(x) change over time; the upper diagram a) shows the measuring values M(x) at a point in time t0; the lower diagram b) shows the measuring values M(x) at a subsequent point in time t1=t0+Delta-t, i.e., later about a value Delta-t. As apparent from FIG. 1, the bulk material 4 lies on the conveyor belt 6 not evenly but, rather, forms specific warping and clumping in the direction of transport F. Thus, in the upper diagram a) of FIG. 2, the individual measuring values M(x) or M1-Mn respectively differ in accordance with the patterns of warping; a specific pattern is formed.

Upon transporting the bulk material 4 via the conveyor belt 6, depending on the design of the conveyor line 1, at first the warping will change only slightly and, therewith, the material accumulations of the bulk material 4 will be redistributed only to a small extent. Thus, the formation of masses or the pattern respectively shown in FIG. 1 will be conveyer further along the direction of transport F.

Thus, as can be seen from the diagrams a) and b), the characteristic formations of warping or patterns or mass accumulations respectively are transported further along over time so that the sequence of measuring values Mi or M(x) respectively remains essentially constant, but being shifted further along via the measuring channels in the direction of transport F. Thus, the time difference Delta-t between diagrams a) and b) corresponds to a channel difference or, respectively, a distance value Delta-X in the signal diagrams of FIG. 2. Hereby, the correlation between Delta-x and Delta-t results in the transport velocity v, i.e., v=Delta-x/Delta-t. Thus, this transport velocity v can be determined with higher accuracy than, e.g., a belt velocity roughly deduced from the rotations speed of the deflector rollers 14, because the actual belt velocity may depend on slippage at the deflector rollers occurring depending on the tension of the elastic conveyor belt the load caused by the mass.

From FIG. 2 a correlation of the measuring values at time t0 and t1 is formed, i.e., an autocorrelation of the measuring signal M(X), across different distance values Delta-X, until the highest significance is determined. Thus, in FIG. 2 a one-dimensional autocorrelation is carried out. Depending on the design as a line array or multi-dimensional matrix it is also possible to carry out, e.g., a 2D autocorrelation.

Thus, it is possible from the measuring signal Mi(t), for one thing, to directly detect the mass in the individual channels X1-Xn, and, for another, to determine the transport velocity v via the conveyor line 2. Thus, it is possible to detect the mass flow W(t) of the bulk material 4 from these two pieces of information as a function of time t.

Thus, in particular, a regulation or controlling may be carried out depending on this determination. Thus, in particular, the mass flow W(t) can be measured via the conveyor line 2, and the bulk material feeder 3 may be controlled depending on the mass flow W(t), so as to regulate the mass flow W(t). Furthermore, it is also possible to control the processing unit 5 so as to receive the respective mass flow W(t).

The FIGS. 3 through 6 show embodiments of various conveyor lines 1: In FIG. 3, a belt conveyor 10 is shown, wherein the measuring principle of FIG. 1 can be realized directly, i.e., the weighing cells 8 are provided, in particular, underneath the conveyor belt 6, since the conveyor belt 6 passes the acting weight directly on to the weighing cells 8. Thus, in this case, it is possible to control the deflector rollers 14 so as to adjust the belt velocity.

In FIG. 4, a screw feeder 11 is shown, wherein weighing cells 8 may be provided distributed in circumferential directions, i.e., both below the screw conveyor 12, as well as in further places on the circumference, i.e., laterally and even above, because in the screw feeder 11 the bulk material 4 is pushed radial outwards and measurements can therefore be made on the circumference. Thus, in this case, a multi-dimensional array of weighing cells 9 may be provided. Thus, in such a screw feeder 11 it is possible to detect successive sensor channels in the screw direction, i.e., successive with an offset in the direction of transport F and circumferential direction in accordance with the screw-type or, respectively, helical motion of transport.

FIG. 5 shows a vibration conveyor 18 or, respectively, a vibrating plate, wherein the weighing cells 8 may be provided directly in the plate elements 20 addressed by the vibration generator 19, or the weighing cells 8 serve directly as plate elements 20 thereby directly detecting the measuring value Mi. In addition to the weight the vibrations are detected, which at first deliver high contributions compromising the measuring results; however, these can be deducted as known or, respectively with a known temporal signal so as to allow for high accuracy measurements.

According to FIG. 6, a deflector plate conveyor 16 is shown, wherein the bulk material 4 is collected on a deflector plate 17 and slips downwards via the deflector plate 17. Hereby, appropriate weighing cells 8 may be provided directly beneath the flexibly designed deflector plate 17.

FIG. 7 shows an embodiment with a cellular wheel conveyor 24 which receives, as a rotation conveyor, a mass flow W at an upper inlet 25 of its housing 26, transports it via individual cells 28 of its rotating drum 29, and discharges it at an outlet 30. Hereby, the weighing cells 8 may be provided, for one thing, on the housing 26, e.g., according to FIG. 7, in a lower position or 180° position respectively of the housing 26, where the bulk material 2 rests at the bottom of the housing 26. Furthermore, or in the alternative, the weighing cells 8 may be provided on a blade element 32 of the rotating drum 29, e.g., at a 90° position, where the bulk material 2 rests on the horizontal blade element 32.

In this embodiment, as well as on others, the transmission of the measuring values M and the energy between the weighing cells 8 and a transmitter and receiver unit 34, in the case of rotating or moving parts, may also occur in the form of wireless signals 36, e.g., using NFC technology or by designing the weighing cells 8 as passive transponders.

The array of weighing cells 9 may be designed as a coating 35 or part of a coating 35 which, consequently, may be attached in suitable areas, in particular, on the static housing and/or on moving parts. Thus, such a coating 35, e.g., in FIG. 7, may be provided on a blade element 32, or even, as in FIG. 6, on the deflector plate 17.

LIST OF REFERENCE NUMERALS

1 conveyor line
2 production plant
3 bulk material feeder (e.g., collecting funnel)
4 bulk material
5 processing unit, for example, extruder
6 conveyor belt
7 processed product
8 weighing cell
9 weighing cells-Matrix, e.g., array of weighing cells
10 belt conveyor
11 screw feeder
12 screw conveyor
14 deflector rollers of the belt conveyor
16 deflector plate conveyor
17 deflector plate
18 vibration conveyor
19 vibrator, vibration generator
20 plate elements
24 cellular wheel conveyor
25 upper access to the housing 26
26 housing
28 cells of the cellular wheel conveyor 24
29 drum
30 outlet of the housing 26
32 blade element
34 transmitter and receiver unit
35 coating, e.g., sensor foil
36 wireless signals
A starting point
B end point
M1 . . . Mn measuring values
Xi, i=1n weighing cells, measuring channels
F direction of transport
V transport velocity
W mass flow
t0 first point in time
t1 second point in time
Delta-t time difference between t0 and t1
Delta-X distance value, spatial offset

The invention claimed is:

1. Method for determining a mass flow of bulk material in a conveyor line, including the following steps:
   providing a conveyor line including an array of weighing cells consisting of a plurality of weighing cells successive in a direction of transport (ST1),
   continuously receiving bulk material, transporting the bulk material on the conveyor line in the direction of transport across the plurality of weighing cells, discharging the bulk material at an end point of the conveyor line (ST2), putting out measuring values of the individual weighing cells as a function of time (ST3), evaluating with comparisons of measuring values as a function of time and a position of the weighing cells in the direction of transport, wherein a structure or sequence of measuring values of spatially successive measuring values of a first measurement at a first point in time (t0) is compared with at least one structure or sequence of measuring values of spatially successive measuring values of a second measurement at a second point in time, and a distance value of the two structures or sequences of measuring values is determined from the comparison, and determining a mass flow from the distance value and the time difference between the first point in time and the second point in time (ST5).

2. Method according to claim 1, characterized in that distance values of the weighing cells in the direction of transport in relation to one another are included in the determination.

3. Method according to claim 1, characterized in that first a transport velocity is determined from the distance value and the time difference and subsequently the mass flow is determined from the transport velocity and the measuring values.

4. Method according to claim 1, characterized in that a one-dimensional or multi-dimensional matrix of measuring values is created for each of at least two points in time, creating at least two matrixes, and from the at least two matrixes a pattern recognition and/or a correlation, is carried out to determine matches in the structures or sequences of measuring values.

5. Method according to claim 1, characterized in that the array of weighing cells is designed as a one- or multi-dimensional matrix consisting of weighing cells arranged successively in the direction of transport.

6. Method according to claim 1, characterized in that the conveyor line is selected from the following group:

a belt conveyor, a screw feeder, a vibration conveyor, a deflector plate conveyor, a cellular wheel conveyor.

7. Method for regulating a mass flow, wherein using a method according to claim 1 a bulk material is transported from the bulk material feed provided at the starting point to a receiving or processing means provided at the end point and measured, and the mass flow on the conveyor line is determined, and the bulk material feed and/or the receiving or processing means is controlled and regulated depending on the determined mass flow.

8. Method according to claim 7, characterized in that the bulk material feed is controlled depending on the determined mass flow in such a manner that a prescribed mass flow is adjusted.

9. Method according to claim 7, characterized in that the receiving or processing means is controlled depending on the determined mass flow, whose transport velocity or production speed is regulated depending on the mass flow.

10. Method according to claim 7, characterized in that the following is fed in as bulk material:

a plastics material and/or rubber material, and one or more additives, where the mass flow of the plastics material and/or rubber material and/or the mass flow of the one or more additives is measured and regulated.

11. Method for determining a mass flow of bulk material in a conveyor line, including the following steps:

providing a conveyor line including an array of weighing cells consisting of a plurality of weighing cells successive in a direction of transport (ST1), continuously receiving bulk material, transporting the bulk material on the conveyor line in the direction of transport across the plurality of weighing cells, discharging the bulk material at an end point of the conveyor line (ST2), putting out measuring values of the individual weighing cells as a function of time (ST3), evaluating with comparisons of measuring values as a function of time and a position of the weighing cells in the direction of transport, wherein a one-dimensional or multi-dimensional matrix of measuring values is created for each of at least two points in time, creating at least two matrixes, and from the at least two matrixes a pattern recognition and/or a correlation, is carried out to determine matches in the structures or sequences of measuring values, and wherein with one time difference in each case, the autocorrelation is carried out with different distance values, and the correct distance value is recognized in the autocorrelation with a highest significance, and determining a mass flow from the evaluation (ST5).

12. Method according to claim 11, characterized in that distance values of the weighing cells in the direction of transport in relation to one another are included in the determination.

13. Method according to claim 11, characterized in that the array of weighing cells is designed as a one- or multi-dimensional matrix consisting of weighing cells arranged successively in the direction of transport.

14. Method for determining a mass flow of bulk material in a conveyor line, including the following steps:

providing a conveyor line including an array of weighing cells consisting of a plurality of weighing cells successive in a direction of transport (ST1), wherein the conveyor line is selected from the following group: a belt conveyor, a screw feeder, a vibration conveyor, a deflector plate conveyor, a cellular wheel conveyor, continuously receiving bulk material, transporting the bulk material on the conveyor line in the direction of transport across the plurality of weighing cells, discharging the bulk material at an end point of the conveyor line (ST2), putting out measuring values of the individual weighing cells as a function of time (ST3), evaluating with comparisons of measuring values as a function of time and a position of the weighing cells in the direction of transport, and determining a mass flow from the evaluation (ST5), wherein a deflector plate conveyor is utilized as the conveyor line; the weighing cells are provided immediately below the deflector plate and/or integrated therein, measuring values of a front weighing cell are used to determine a particle mass of the impinging material, and slippage characteristics are determined as transport velocity from subsequent weighing cells.

15. Transporting and measuring device for transporting and measuring a mass flow of bulk material, the transporting and measuring device comprising:

a conveyor line adapted to transport bulk material as a mass flow (W) from at least one starting point in a direction of transport up to an end point, an array of weighing cells consisting of a plurality of weighing cells, arranged successively in the direction of transport, each detecting a mass load, and outputting measuring values as a function of time, and an evaluation device adapted to evaluate the measuring values as a function of time and a position of the weighing cells in the direction of transport, wherein the evaluation device is designed to compare the structure or sequence of measuring values of spatially successive measuring values of a first measurement at a first point in time with at least one structure or sequence of measuring values of a second first measurement at a second point in time, and to determine a distance value or spatial offset of the two structures or sequence of measuring values from the comparison.

16. Transporting and measuring device according to claim 15, characterized in that the conveyor line is designed as a belt conveyor including a conveyor belt under which or integrated in which the plurality of weighing cells is arranged.

17. Transporting and measuring device according to claim 15, characterized in that it is designed as a screw feeder including a screw conveyor, the weighing cells being provided in a lower floor area and distributed in areas successive in the circumferential direction.

18. Transporting and measuring device according to claim 15, characterized in that at least some of the weighing cells are designed as an element from the group consisting of piezo sensors and/or wire strain gauges, and wherein at least some of the weighing cells are further designed as a coating or part of a coating including individual weighing cells.

19. Transporting and measuring device according to claim 15, characterized in that a transmission of the measuring values and/or of energy from and to the weighing cells is provided to be wireless and/or by means of passive transponders.

20. Transporting and measuring device according to claim 15, characterized in that the plurality of weighing cells is arranged as a one-dimensional line array or multi-dimensional matrix, including weighing cells successive in the direction of transport.

21. Transporting and measuring device for transporting and measuring a mass flow of bulk material, the transporting and measuring device comprising:

a conveyor line, designed as a vibration conveyor, and adapted to transport bulk material as a mass flow (W) from at least one starting point in a direction of transport up to an end point, an array of weighing cells consisting of a plurality of weighing cells, arranged successively in the direction of transport, each detecting a mass load, and outputting measuring values as a function of time, wherein the plurality of weighing cells are provided in the plate elements actuated by a vibration means or as plate elements, and an evaluation device adapted to evaluate the measuring values as a function of time and a position of the weighing cells in the direction of transport.

22. Transporting and measuring device for transporting and measuring a mass flow of bulk material, the transporting and measuring device comprising:

a conveyor line, designed as a deflector plate conveyor including a downward sloping deflector plate, and adapted to transport bulk material as a mass flow (W) from at least one starting point in a direction of transport up to an end point, an array of weighing cells consisting of a plurality of weighing cells, arranged successively in the direction of transport, each detecting a mass load, and outputting measuring values as a function of time, wherein the weighing cells are provided under the deflector plate or integrated therein, and an evaluation device adapted to evaluate the measuring values as a function of time and a position of the weighing cells in the direction of transport.

* * * * *